United States Patent

[11] 3,614,387

| [72] | Inventors | Ronald M. Wrob<br>Sunset Hills;<br>John B. Kidney, Hazelwood, both of Mo. |
|------|-----------|---|
| [21] | Appl. No. | 859,623 |
| [22] | Filed | Sept. 22, 1969 |
| [45] | Patented | Oct. 19, 1971 |
| [73] | Assignee | Watlow Electric Manufacturing Co.<br>St. Louis, Mo. |

[54] ELECTRICAL HEATER WITH AN INTERNAL THERMOCOUPLE
9 Claims, 7 Drawing Figs.

[52] U.S. Cl. .................................................. 219/328,
73/341, 219/209, 219/330
[51] Int. Cl. ..................................................... H05b 1/00
[50] Field of Search........................................... 219/328,
494, 330, 510, 331, 512, 335, 209; 73/341,
359–361; 136/4, 230

[56] References Cited
UNITED STATES PATENTS

| 1,373,411 | 4/1921 | Clark............................ | 219/513 |
| 2,717,952 | 9/1955 | Dvorak......................... | 219/241 X |
| 2,735,923 | 2/1956 | Juvinall et al................. | 219/241 X |
| 2,747,074 | 5/1956 | Finch............................ | 219/241 X |
| 2,897,335 | 7/1959 | Finch............................ | 219/241 X |

FOREIGN PATENTS

| 587,633 | 5/1947 | Great Britain................ | 219/328 |
| 363,735 | 9/1962 | Switzerland................... | 219/328 |

Primary Examiner—C. L. Albritton
Attorney—Robert J. Eck

ABSTRACT: An electrical sheath heater incorporating a thermocouple having its measuring junction end positioned against the inner sheath wall and its other end connected to a temperature gauge exteriorly of the sheath for accurately determining the sheath temperature during usage.

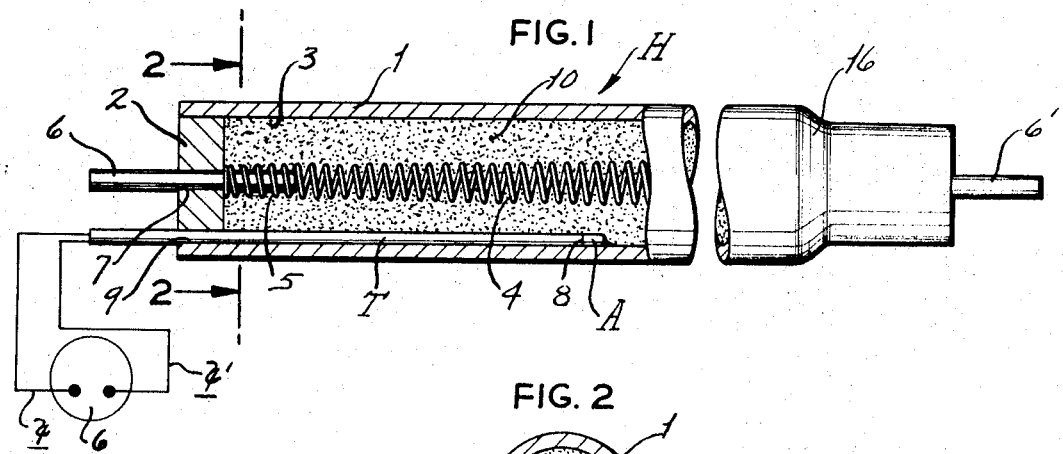
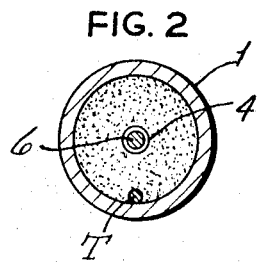
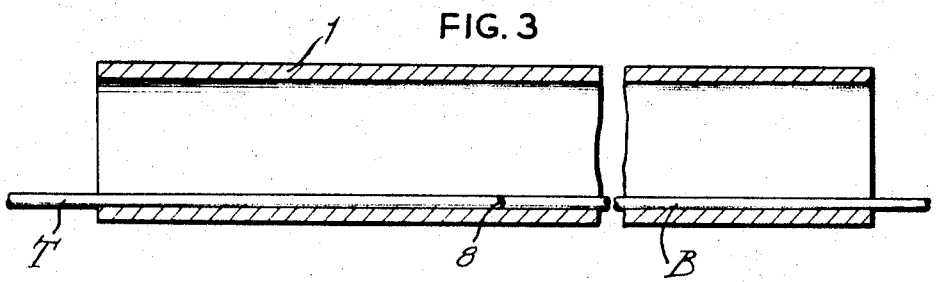
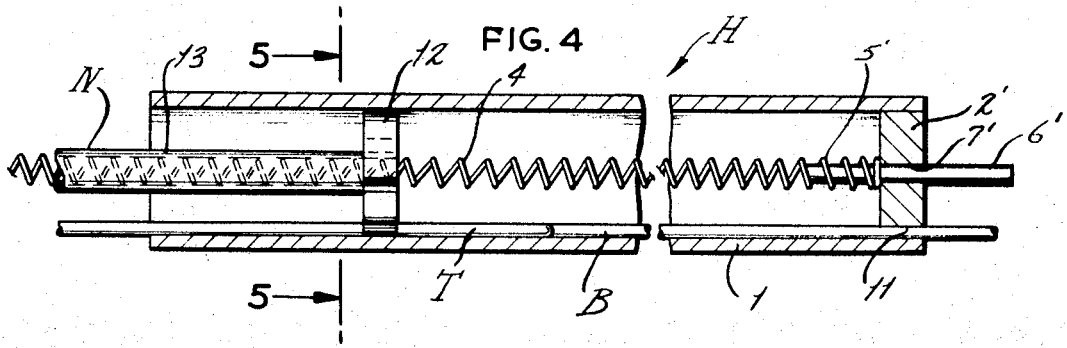

PATENTED OCT 19 1971     SHEET 2 OF 2     3,614,387

INVENTORS
RONALD M. WROB
JOHN B. KIDNEY
BY Robert J Eck
ATTORNEY

ELECTRICAL HEATER WITH AN INTERNAL THERMOCOUPLE

BACKGROUND OF THE INVENTION

The present invention relates in general to electrical heaters and, more particularly, to an electrical heater incorporating a thermocouple interiorly of the heater sheath.

In utilizing electrical heaters for effecting heat transfer to a fluid medium, such as, water, chemical solutions or gases, it is desirable, and often times necessary, to know the sheath temperature for determining pertinent heat transfer data. Such data is commonly utilized in situations where temperature is a critical factor, such as when a process is being followed with stringent temperature criteria, or where the medium tested may explode or change form at a particular temperature having undesirable consequences. Heretofore, attempts have been made to measure the sheath temperature of an immersible heater by either placing a temperature-measuring device within the fluid medium independent of the heater, or by attaching such device to the exterior portion of the heater. In the former case, the readings were an inaccurate measurement of the sheath temperature because of remoteness of the measuring device, and in the latter case the physical condition of the sheath was altered thereby causing unsuitable fluid flow within the fluid medium as well as developing nucleating sites. Therefore, the present invention embodies sealing a thermocouple interiorly of the heater sheath against the wall thereof so that the sheath temperature may be readily and accurately obtained at all times without disturbing the fluid medium in which it is immersed.

SUMMARY OF THE INVENTION

It is an object of the present invention to provide an electrical heater incorporating a thermocouple interiorly of its sheath which permits accurate measurement of the sheath temperature so that heat transfer data, such as, the heat transfer coefficient, may be recorded for determining the effectiveness of heat transfer during operation.

Another object of the present invention is to provide an electrical heater of the character described wherein the measuring junction of the thermocouple is positioned against the sheath inner wall for readily and accurately measuring the sheath temperature.

A further object of the present invention is to provide an electrical heater of the character described wherein the measuring junction of said thermocouple is maintained against the sheath inner wall during the filling operation.

A still further object of the present invention is to provide an electrical heater of the character described which utilizes a filler rod nozzle having a complementary notch for snugly receiving said thermocouple to urge same against the sheath wall during the filling operation.

Another object of the present invention is to provide an electrical heater of the character described which incorporates a plurality of thermocouples interiorly of the sheath with the measuring junctions of each being presented at longitudinally spaced-apart locations along sheath length for simultaneously determining the sheath temperature at preselected locations.

A further object of the present invention is to provide an electrical heater of the character described wherein thermocouples are inserted within both ends of the heater sheath.

A still further object of the present invention is to provide an electrical heater of the character described which is inexpensive in manufacture and reliable and durable in usage.

BRIEF DESCRIPTION OF THE DRAWINGS

FIG. 1 is a side view in partial section of an electrical heater incorporating a thermocouple constructed in accordance with and embodying the present invention, illustrating same in partially swaged condition.

FIG. 2 is a vertical section taken on the line 2—2 of FIG. 1.

FIG. 3 is a longitudinal sectional view of the sheath illustrating the positioning of a thermocouple therein prior to the filling operation.

FIG. 4 is a longitudinal sectional view of the sheath illustrating same same during the filling operation.

DESCRIPTION OF THE PRACTICAL EMBODIMENTS

Figure 5:
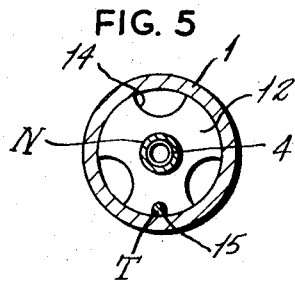
FIG. 5 is a vertical section taken on the line 5—5 of FIG. 4.

Referring now by reference characters to the drawings which illustrate practical embodiments of the present invention, H generally designates an electrical heater of the tubular type comprising a metal sheath 1, the ends of which are closed by sealing plugs 2,2' fabricated of suitable dielectric, heat refractory material, such as, lava or other like ceramic substances; said plugs 2,2' cooperating with sheath 1 to define a compartment 3. Coaxially disposed within said compartment 3 is a resistance element 4, as of conventional metal alloys, such as copper, nickel, chromium, and the like, which element is preferably helical in configuration, being diametrically reduced at its ends, as at 5,5'; for snugly receiving the inner end portions of elongated conductors 6,6', respectively. The outer end portions of conductors 6,6' project through central openings 7,7', respectively, for connection to a convenient source of power (not shown). Presented within compartment 3 against the inner face of sheath 1 is a relatively elongate thermocouple T of conventional construction having a measuring junction 8 at its inner end; said thermocouple T projecting through an opening 9 in sealing plug 2 for connection at its opposite or outer end by leads $x, x_1$ to a customary temperature gauge G such as, a millivolt meter or a potentiometer calibrated in temperature. Said measuring junction 8 is located at a predetermined distance from sealing plug 2 for temperature measurement at such preselected point. Compartment 3 is filled with a granular, electrically insulating, heat conductive, refractory material, indicated at 10, such as magnesium oxide, or boron nitride for surrounding element 4 and maintaining thermocouple T in engagement with the inner face of sheath 1.

During the assembly of heater H, it is important that thermocouple T be maintained in engagement against the inner face of sheath 1, while compartment 3 is being filled with said granular refractory material 10. FIGS. 1 and 2 illustrate one embodiment for assuring such engagement wherein A designates a positioning member which is attached to the measuring junction 8 of thermocouple T. Said positioning member A is of relatively short length and of substantially the same cross-sectional area as thermocouple T. To preclude undesired displacement during the filling operation, which will be described hereinbelow, said positioning member A is fixed to the inner wall of sheath 1, as by welding, brazing or the like.

Another embodiment for assuring that thermocouple T will not be displaced during the filling operation is shown in FIGS. 3, 4 and 5, wherein B designates a positioning member which is attached to measuring junction 8 of thermocouple T. Said positioning member B is of substantially the same cross-sectional area as thermocouple T, and of such length as to project outwardly through an opening 11 in sealing plug 2'; said latter maintaining the positioning member B of thermocouple T in position against the inner face of sheath 1. Additionally, the thermocouple may be placed under sufficient tension to further assure retention against the inner face of sheath 1 prior to filling.

Heaters H are normally filled with refractory material 10 by means of a standard filling nozzle N comprising a head 12, which is of substantially the same diameter as the inner diameter of sheath 1, and an elongate tube 13 provided centrally of head 12 in normal relationship therewith. Head 12 is provided with a plurality of nozzle openings 14 arranged in circumferentially spaced.apart relationship and adapted to disburse refractory material 10 therethrough within sheath 1. Further provided within head 12 is a notch 15 formed on a radius substantially the same as the radius of thermocouple T and the positioning members A and B for snugly receiving same.

With sealing plug 2' in fitted position within sheath 1 and plug 2 removed, filling nozzle N is inserted within the open end of sheath 1 receiving resistance element 4 within tube 13 and thermocouple T within notch 15. When head 12 of nozzle N is positioned adjacent plug 2', the refractory material 10 is poured within sheath 1 for disbursement through nozzle openings 14 for filling the sheath as nozzle N is withdrawn therefrom. It will be observed that while the refractory material 10 is being disbursed through nozzle openings 14, head 12 will urge the thermocouple T and the respective positioning members A, B depending on its relative position within sheath 1, against the inner face of sheath 1 thereby assuring the positionment of thermocouple T against the inner face of sheath 1. After sheath 1 is filled with refractory material 10, sealing plug 2 is inserted and sheath 1 is diametrically reduced, as at 16 (FIG. 1) by swaging, rolling, or the like.

Figure 6:
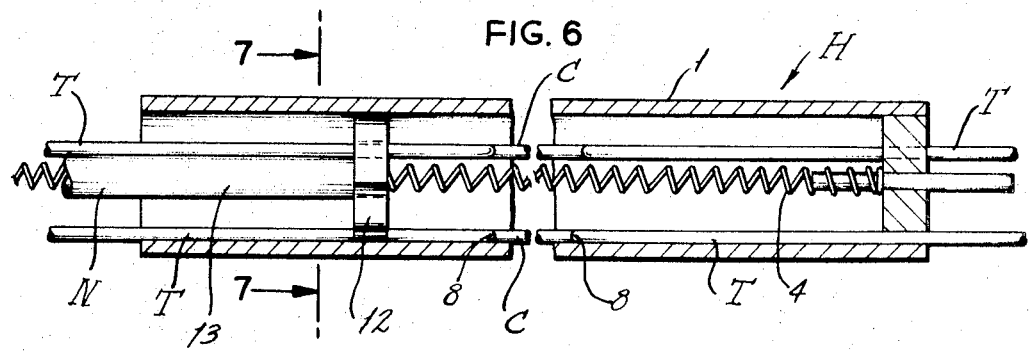
FIG. 6 is a longitudinal sectional view of an electrical heater incorporating a plurality of thermocouples illustrating the positioning of same during the filling operation.
Figure 7:
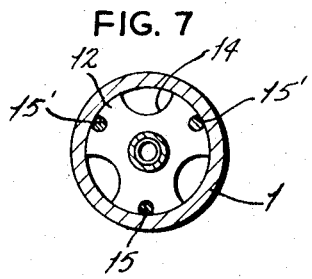
FIG. 7 is a vertical transverse section taken on the line 7—7 of FIG. 6.

Sheath temperature varies in electrical heaters H of relatively long extent, so it is desirable to have more than one temperature measuring point located within sheath 1. In this instance, a plurality of thermocouples T are positioned within sheath 1, as shown in FIGS. 6 and 7, being inserted within the opposite ends of sheath 1 and being in axially alignment. The particular number of thermocouples T utilized will be determined by the desired number of temperature readings along sheath 1. The aligned thermocouples are connected by a positioning member C which is fixed at its ends to the measuring junctions 8 of their related thermocouple T and is of substantially the same cross-sectional area thereof. The related, aligned thermocouples T will be placed under sufficient tension to maintain same in engagement against the inner face of sheath 1. Additionally, the head 12 of nozzle N will be provided with a corresponding number of notches, as at 15', for accommodating the respective thermocouples T placed within sheath 1 for urging same against the inner face of sheath 1 during the filling operation. It will be understood that positioning members A and B may also be employed as above described when thermocouples T are inserted within both ends of sheath 1. Thus, it can be seen that by utilizing positioning members A, B and C of the present invention, the measuring junction 8 of a thermocouple T is maintained in engagement with the inner wall of sheath 1 for assuring accurate temperature readings.

Having described our invention, what we claim and desire to obtain by Letters Patent is:

1. The combination of an electrical heater having a tubular sheath; a resistance element sealed within said sheath; a source of power; conductors electrically connecting said resistance element to said source of power; and of sheath temperature determining means comprising: at least one thermocouple having a portion disposed against the inner sidewall of said sheath, a measuring junction at one end of said thermocouple located within said sheath, means for maintaining said thermocouple portion against the sheath inner wall, temperature measuring means provided remotely from said heater, and means electrically connecting said temperature-measuring means with said thermocouple for determining the sheath temperature of said heater at the region immediately adjacent said measuring junction.

2. The combination of an electrical heater having a tubular sheath; a resistance element sealed within said sheath; a source of power; conductors electrically connecting said resistance element to said source of power; and of sheath temperature-determining means comprising: a first thermocouple having a portion extending within one end of said sheath and disposed against the inner sidewall thereof, a measuring junction at one end of said first thermocouple located within said sheath, a second thermocouple having a measuring junction and a portion disposed within the other end of said sheath in axially aligned relationship to said first thermocouple; means for maintaining said thermocouple portions against the sheath inner wall including a positioning member connecting the measuring junctions of said first and second thermocouples; temperature-measuring means provided remotely from said heater; and means electrically connecting said temperature-measuring means with each of said first and second thermocouples for determining the sheath temperature adjacent the measuring junction of said first and second thermocouples.

3. The combination of an electrical heater having a tubular sheath; a resistance element sealed within said sheath; a source of power; conductors electrically connecting said resistance element to said source of power; and of sheath temperature-determining means comprising: at least one thermocouple having a portion disposed against the inner sidewall of said sheath; a measuring junction at one end of said thermocouple located within said sheath; means for maintaining said thermocouple portion against said sheath inner wall comprising a positioning member attached to the measuring junction end of said thermocouple; means for retaining the positioning member against the sheath wall; temperature-measuring means provided remotely from said heater; and means electrically connecting said temperature-measuring means with said thermocouple for determining the sheath temperature of said heater.

4. The invention as defined in claim 3, and further characterized by said positioning member having a relatively short length and a cross-sectional area of substantially the same dimension as said thermocouple, said positioning member being fixed to the sheath wall.

5. The invention as defined in claim 3 and further characterized by said positioning member having a relatively elongate length projecting outwardly endwise of said sheath, a sealing plug fitted within one end of said sheath, said sealing plug having an opening for snugly receiving said positioning member for maintaining same against the sheath wall.

6. The invention as defined in claim 3 and further characterized by a plurality of thermocouples located within said sheath, each thermocouple having a measuring junction located at circumferentially spaced-apart positions of said sheath, said electrically connecting means connecting said temperature-measuring means with each thermocouple for determining the temperature of the sheath at said various positions.

7. The invention as defined in claim 6 and further characterized by a positioning member attached to each thermocouple, said positioning member having a relatively short length and a cross-sectional area of substantially the same dimension as the related thermocouple, said positioning member being fixed to the sheath wall.

8. The invention as defined in claim 6 and further characterized by a positioning member attached to measuring junction end of each thermocouple, each positioning member having a relatively elongate length projecting outwardly endwise of said sheath, a sealing plug fitted within one end of said sheath, said sealing plug having a plurality of openings for receiving the related positioning member for maintaining same against the sheath wall.

9. The invention as defined in claim 6 and further characterized by a first set of thermocouples having a length projecting within one end of said sheath, a second set of thermocouples having a length extending within the other end of said sheath, the thermocouples of said first set being axially aligned with the thermocouples of said second set, a positioning member connecting the measuring junction ends of the related aligned thermocouples.